United States Patent
Loup

(10) Patent No.: US 6,280,316 B1
(45) Date of Patent: Aug. 28, 2001

(54) HEATING AND/OR AIR-CONDITIONING DEVICE FOR A MOTOR VEHICLE WITH REMOVABLE AIR FILTER

(75) Inventor: Didier Loup, Maurepas (FR)

(73) Assignee: Valeo Climatisation (FR)

( * ) Notice: Subject to any disclaimer, the term of this patent is extended or adjusted under 35 U.S.C. 154(b) by 0 days.

(21) Appl. No.: 09/407,460

(22) Filed: Sep. 28, 1999

(30) Foreign Application Priority Data

Sep. 28, 1998 (FR) .................................... 98 12090

(51) Int. Cl.$^7$ ........................................ B60H 3/06
(52) U.S. Cl. ................... 454/158; 055/467.1; 055/506
(58) Field of Search .......................... 454/158; 55/385.2, 55/467.1, 467, 471, 506, 502

(56) References Cited

U.S. PATENT DOCUMENTS 2,655,091 * 10/1953 Geiger .................... 454/158
5,062,353    11/1991 Arold et al. .

FOREIGN PATENT DOCUMENTS

| 40 04 501 | 8/1991 | (DE) . |
| 40 21 460 | 1/1992 | (DE) . |
| 44 19 626 | 1/1995 | (DE) . |
| 196 16 436 | 4/1997 | (DE) . |
| 198 18 178 | 11/1998 | (DE) . |
| 0 744 309 | 11/1996 | (EP) . |
| 2 731 657 | 9/1996 | (FR) . |

OTHER PUBLICATIONS

French Search Report dated Jun. 18, 1999.

* cited by examiner

Primary Examiner—Harold Joyce
(74) Attorney, Agent, or Firm—Morgan & Finnegan, LLP

(57) ABSTRACT

A heating and/or air-conditioning device for a motor vehicle comprises a casing (12) housing a motor-driven fan unit (16) suitable for impelling a flow of air and a removable air filter (28) suitable for filtering the impelled airflow. The casing (12) is arranged in the passenger compartment (H) of the vehicle along the bulkhead (14) separating the engine compartment (CM) from the passenger compartment (H), and provision is made for the bulkhead and the casing to include respective access apertures (32, 30) arranged facing one another in order to allow the filter (28) to be withdrawn out of the casing through the engine compartment, exchanged if appropriate and re-inserted into the casing.

7 Claims, 3 Drawing Sheets

HEATING AND/OR AIR-CONDITIONING DEVICE FOR A MOTOR VEHICLE WITH REMOVABLE AIR FILTER

FIELD OF THE INVENTION

The invention relates to heating and/or air-conditioning devices for motor vehicles.

It relates more particularly to a device comprising a casing housing a motor-driven fan unit suitable for impelling a flow of air and a removable air filter suitable for filtering the impelled airflow, the casing being suitable for being arranged in the passenger compartment.

BACKGROUND OF THE INVENTION

In a device of this type, the motor-driven fan unit, also called impeller, includes a casing housing a centrifugal turbine driven by a motor so as to deliver a pressurized airflow to an outlet duct. This airflow next passes through an air filter then a heating-refrigeration unit mounted downstream and including heat exchangers (radiator and evaporator, if appropriate) making it possible to heat or cool the air which will then be delivered to the passenger compartment via various ducts and distribution vents.

In the majority of known devices, the motor-driven fan unit, the air filter and the heating-refrigeration unit are placed in a generally aligned configuration, which increases the overall size of the device. Moreover, such a configuration does not always allow easy removal of the air filter to make it possible, at regular intervals, to check the state of the filter and to exchange a used filter for a new filter.

Various filter configurations have already been proposed with a view to facilitating removal. Hence, it is known to remove the air filter from the passenger compartment, as taught, for example, by DE-A-40 04 501 and FR 2 731 657. However, access to the filter from the passenger compartment is generally difficult, and the instrument panel does not always have sufficient space available to arrange a cover plate in it for accessibility to the filter.

Otherwise, the document EP 0 744 309 teaches that it is possible to gain access to the air filter from the water separator. However, this location is generally constricted, so that the insertion and the positioning of the filter downstream of the water separator is not generally easy. Moreover, the stopper enclosing the filter should be perfectly impervious to water.

Moreover, these known solutions do not make it possible to reduce the size of the device.

Consequently one object of the invention is to propose a heating and/or air-conditioning device possessing a reduced size, especially in the direction of the longitudinal axis of the vehicle, while providing means allowing easy removal of the air filter.

SUMMARY OF THE INVENTION

According to the present invention there is provided a heating and/or air-conditioning device for a motor vehicle which includes a bulkhead separating the engine compartment from the passenger compartment, the device comprising a casing housing a motor-driven fan unit suitable for impelling a flow of air, a heat exchanger and a removable air filter suitable for filtering the impelled airflow, wherein at least a part of a wall of the casing is arranged adjacent to the bulkhead, and wherein the bulkhead and the casing include respective access apertures arranged facing one another in order to allow the filter to be withdrawn from the casing via the engine compartment, exchanged if appropriate and re-inserted into the casing.

This characteristic particularly allows a non-aligned configuration of the assembly formed by the motor-driven fan unit, the air filter and the heating-refrigeration unit, given that the air filter can be placed in a part of the casing which is immediately adjacent to the bulkhead separating the engine compartment from the passenger compartment. Such a configuration also allows the motor-driven fan unit to be placed in a position adjacent to the bulkhead, which reduces the overall size of the device.

In one preferred embodiment of the invention, the air filter is arranged between the motor-driven fan unit and the heat exchanger. The filter is generally arranged upstream of the impeller. However, the airway cross-section is small at this site. Hence, the filters which are arranged at this site have to be of reduced dimensions and have consequently to be changed more often so as to ensure a minimum loss of pressure head for the device.

According to another characteristic of the invention, the motor-driven fan unit and the air filter are arranged side-by-side in the transverse direction of the vehicle.

Put other way, the motor-driven fan unit and the air filter can both be placed in a position adjacent to the bulkhead called "semi-centered position", which makes it possible to reduce the size of the device, especially in the direction of the longitudinal axis of the vehicle.

According to yet another characteristic of the invention, the motor-driven fan unit includes a centrifugal turbine suitable for being driven in rotation about a horizontal axis parallel to the longitudinal axis of the vehicle.

In one embodiment of the invention, the device includes a cover plate which can be accessed via the aperture in the bulkhead and is suitable for closing off the aperture in the casing. In this case, only the bulkhead is closed off by the cover plate and it is necessary only to remove this cover plate in order to gain access to the filter.

In supplement, the device may comprise another cover plate suitable for closing off the aperture in the bulkhead.

In one preferred embodiment, the device includes a cover plate suitable for closing off both the aperture in the bulkhead and the aperture in the casing. In such a case, it is advantageous for the cover plate to include a flap suitable for closing off the aperture in the bulkhead, on the engine compartment side, and a stopper attached to the flap and suitable for jointly closing off the aperture in the bulkhead and the aperture in the casing.

This stopper is preferably formed from at least one insulating foam. In particular, this stopper advantageously includes an outer shell of dense foam surrounding an inner lining of lightweight foam serving for wedging the filter.

BRIEF DESCRIPTION OF THE DRAWINGS

Preferred embodiments of the invention will now be described with reference to the accompanying drawings, in which.

DESCRIPTION OF THE PREFERRED EMBODIMENTS

Figure 1:
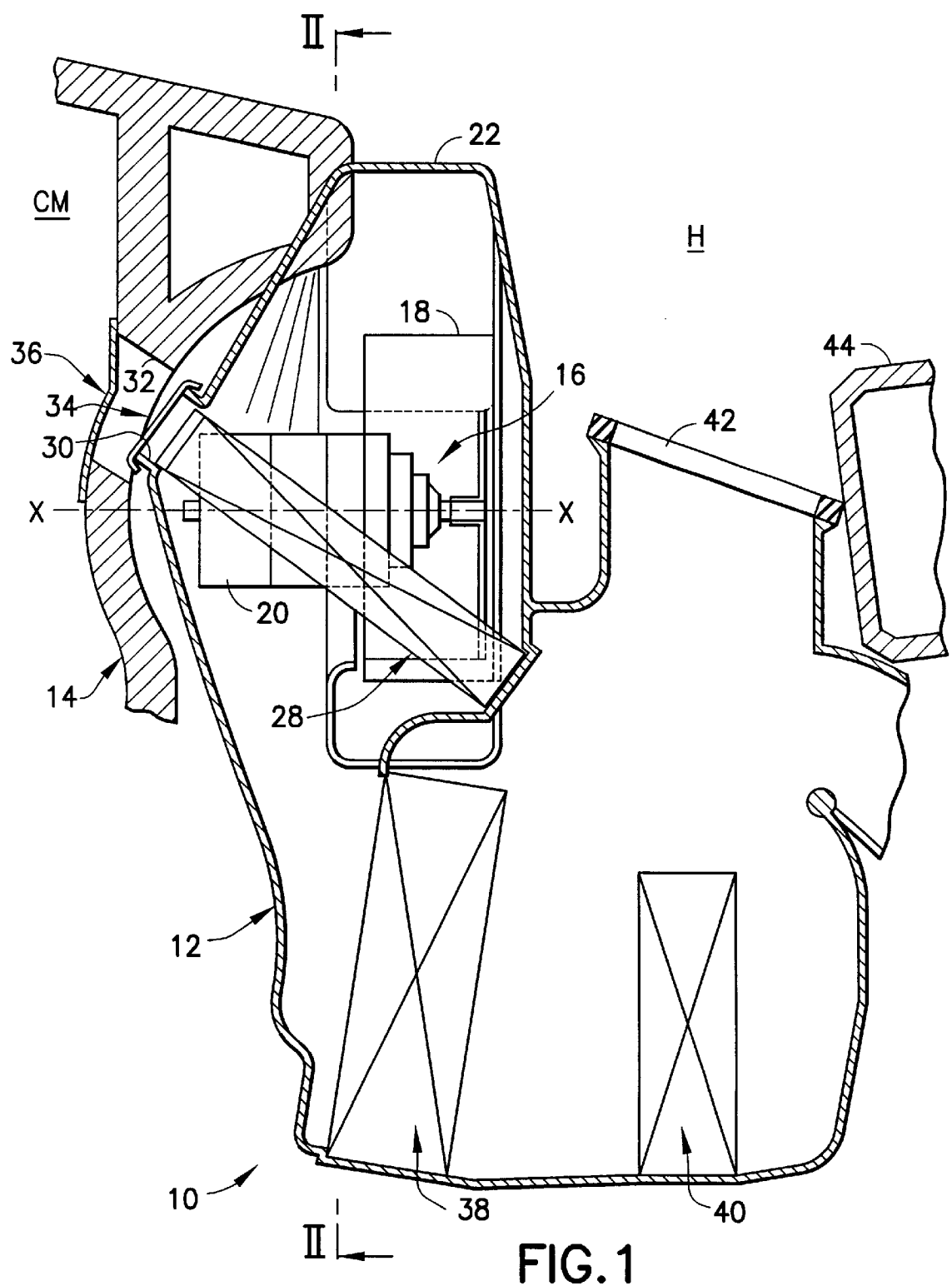
FIG. 1 is a view in longitudinal section of a heating and/or air-conditioning device according to one preferred embodiment of the invention.
Figure 2:
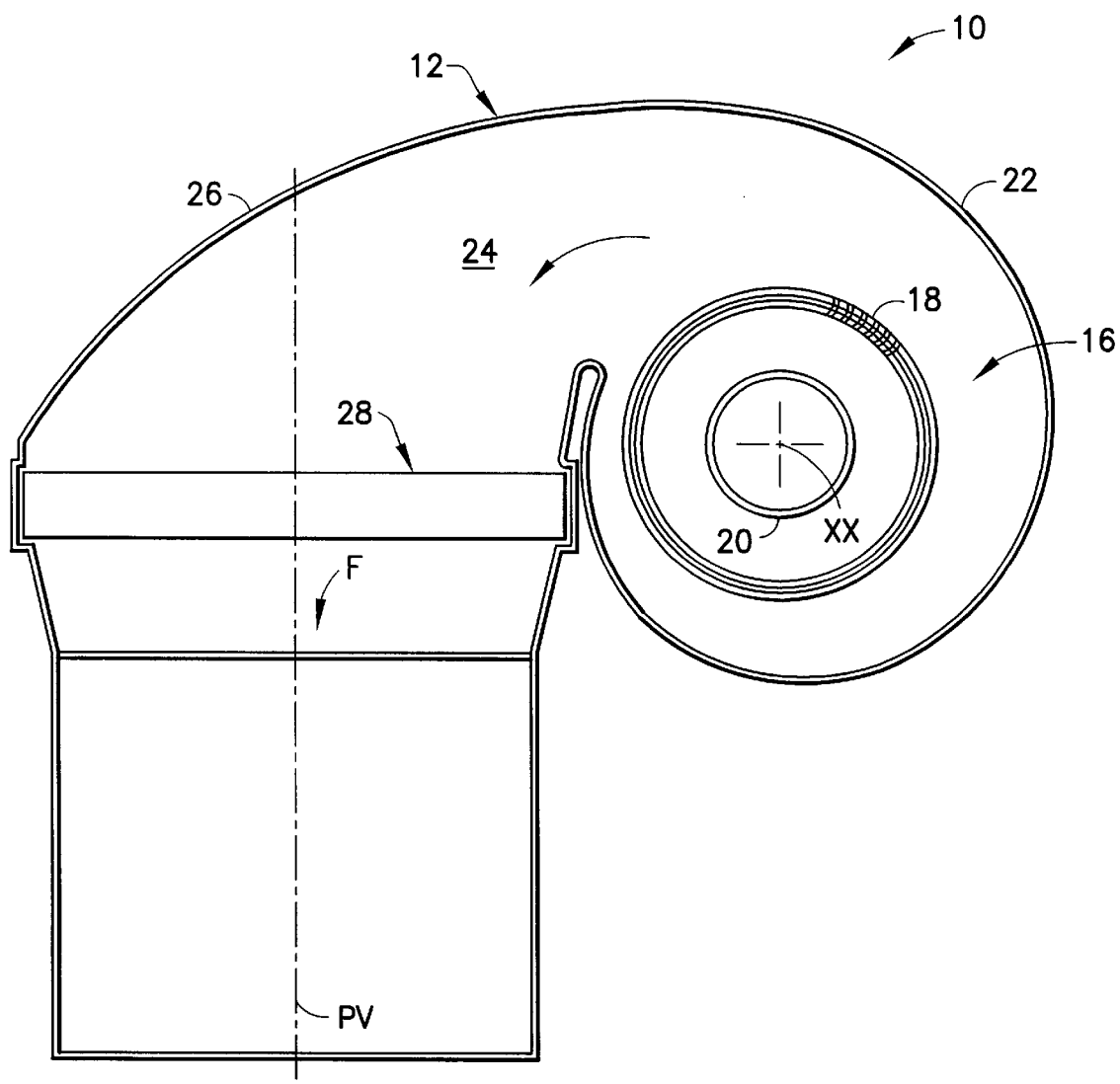
FIG. 2 is a view in section along the line II—II of FIG. 1.

Referring first of all to FIGS. 1 and 2, a heating and/or air-conditioning device is represented, designated overall by the reference 10. This device comprises a casing 12 which is housed in the passenger compartment H of a motor vehicle, and more precisely along a bulkhead 14 forming a separating partition between the engine compartment CM and the passenger compartment H.

The casing 10 first of all houses a motor-driven fan unit 16 essentially including a centrifugal turbine 18 driven by an electric motor 20 about an axis XX which, in this example, is substantially horizontal and parallel to the longitudinal axis (or X axis) of the vehicle. The turbine is driven in rotation in an element 22 of the casing, called "volute", which circumferentially encases the turbine with an increasing cross-section. This volute has the function of diverting the airflow delivered radially by the turbine along a substantially tangential direction. This airflow thus leaves the volute via an outlet 24 and is then diverted by a wall 26 of the casing towards an air filter 28.

As can be seen in FIGS. 1 and 2, the motor-driven fan unit 16 is arranged in a position adjacent to the bulkhead 14, and the same is true for the air filter 28, so that the motor-driven fan unit and the air filter are arranged in adjacent positions in the transverse direction of the vehicle (that is to say perpendicularly to the longitudinal axis) This provides a position called "semi-centered", in which the casing is centered with respect to the central vertical plane PV of the vehicle (FIG. 2), except for the motor-driven fan unit which is offset on the right-hand side or on the left-hand side of the passenger compartment.

The air filter 28 consists of a removable cartridge which is arranged in an inclined position, the cartridge being inclined upwards towards the front, that is to say towards the engine compartment CM.

In order to allow the air filter 28 to be removed, the casing 12 and the bulkhead 14 are provided with respective apertures 30 and 32 arranged facing one another (FIGS. 1 and 2). The aperture 30 is equipped with a cover plate 34, which is accessible from the engine compartment, through the aperture 32 in the bulkhead. In this embodiment, the aperture 32 can be left free, or it is possible, in a variant, to provide another cover plate 36 intended to close off the aperture 32, and formed independently of the cover plate 34.

The filtered airflow which has left the filter then passes through a heating-refrigeration unit comprising at least one heat exchanger and, in this example, an evaporator 38 linked to a conventional air-conditioning circuit and a heating radiator 40, which usually carries a hot fluid, such as the cooling liquid from the engine of the vehicle.

The filtered airflow passes through this unit so as to be cooled and/or heated and then to be distributed into the passenger compartment H through various ducts and distribution vents. For the sake of simplicity, only one of the vents 42 serving for de-icing/de-misting the windscreen has been represented in FIG. 1. Needless to say, the device also includes other vents, in particular fresh air vents provided on the dashboard and vents opening out into the lower part of the passenger compartment.

As can be seen in FIG. 1, because of the combined arrangement of the motor-driven fan unit and of the air filter along the bulkhead, the device exhibits a reduced size in the longitudinal direction, which makes it possible to integrate it at least partly between the bulkhead and a receptacle 44 serving to house a car radio or another accessory of the same type.

Hence, in order to allow the filter to be withdrawn, it is sufficient, after having opened the bonnet, successively to remove the cover plates 36 and 34 and to extract the air filter in an upwards-sloping direction. This makes it possible to check the state of the filter and to replace it, if necessary, with a new filter, if the filter is soiled.

Figure 3:
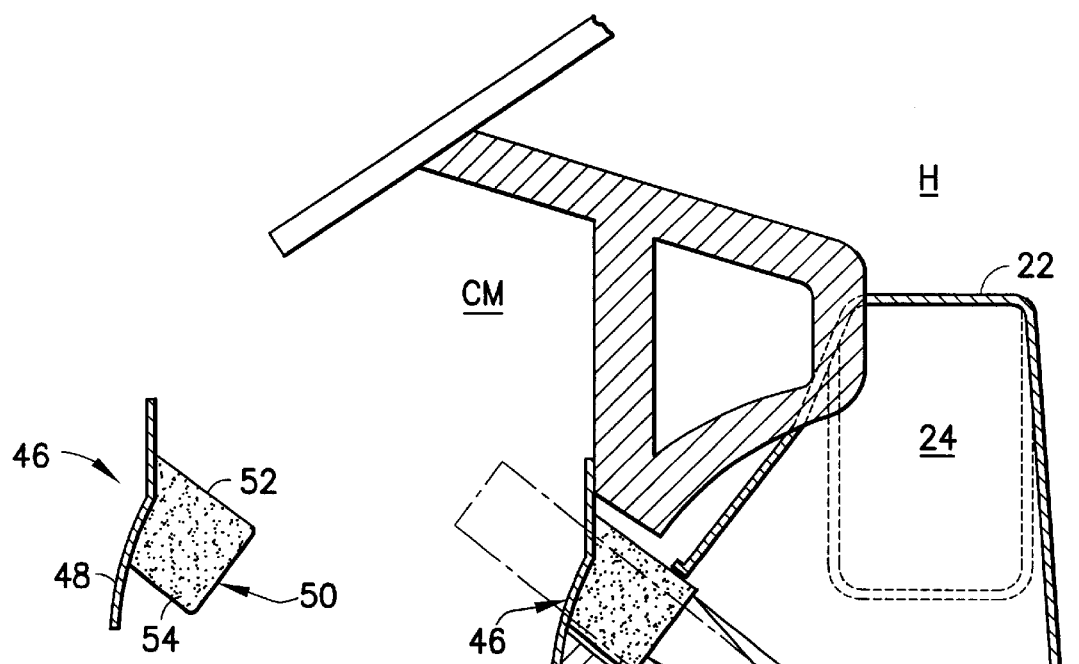
FIG. 3 is a view in partial section corresponding to FIG. 1 in a variant embodiment.

In the embodiment of FIG. 3, the filter 28 takes up an inclined position similar to that of FIG. 1. In contrast, the device includes a single cover plate 46 suitable for jointly closing off the respective apertures 30 and 32 in the casing and in the bulkhead. This cover plate 46 (FIG. 4) comprises a flap 48 forming a closing door fitting against the bulkhead, on the engine compartment side. This flap 48 is attached to a stopper 50 having a shape matching the apertures 30 and 32 so as to close them off jointly when the cover plate 46 is put in place. This stopper 50 includes a shell 52 produced from dense foam and forming the actual stopper. This shell surrounds an inner lining 54 produced from lightweight foam and serving to wedge the air filter when the cover plate 46 is put in place. It results therefrom that the air filter is held in the perfect position in the casing.

Figure 5:
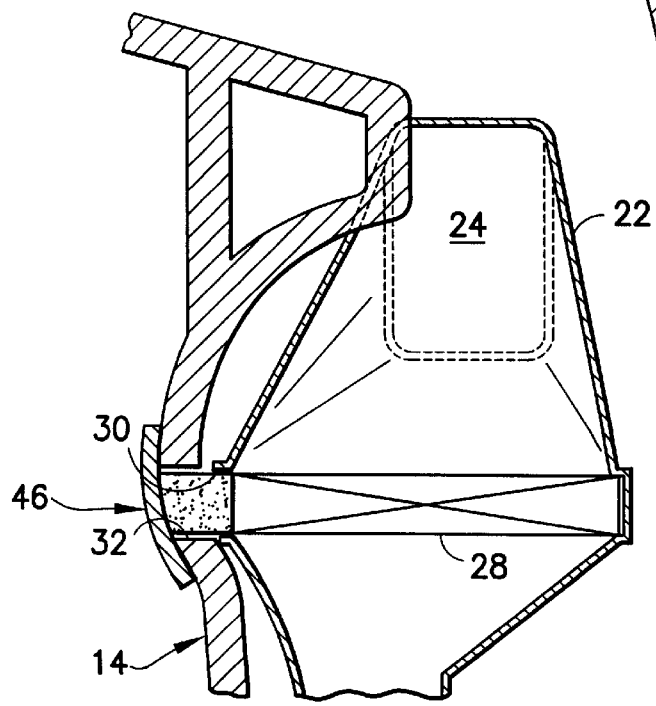
FIG. 5 is a sectional view similar to FIG. 1 in another embodiment.

In the embodiment of FIG. 5, referred to now, the device comprises an overall structure similar to that of FIG. 1. The main difference lies in the fact that the air filter 28 here is placed in a substantially horizontal position. It results therefrom that the respective apertures 30 and 32 in the casing and in the bulkhead are formed at different places and facing one another. Hence, withdrawal of the filter takes place with a generally horizontal movement.

Figure 4:
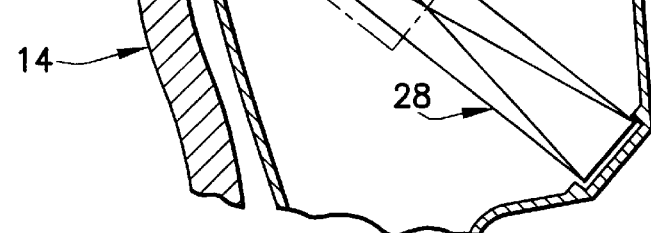
FIG. 4 is a sectional view of the cover plate of the device of FIG. 3.

As in the previous case, it is possible to provide either a single cover plate serving to close off the aperture in the casing, or two cover plates serving respectively to close off the aperture in the casing and the aperture in the bulkhead, or even a common cover plate serving to close off the two apertures jointly. In this example, a single cover plate 46 similar to that of FIG. 3 and 4 is provided.

In the case in which a single cover plate with a stopper is used, including two foams of different density, the shell made of dense foam carries out a function of thermal insulation and a sealing function, while the lightweight-foam lining carries out a function of wedging the air filter.

Needless to say, the device of the invention is capable of numerous variants, as long as the air filter is situated in the position adjacent to the bulkhead in order to allow it to be extracted through the engine compartment, including via the water separator.

What is claimed is:

1. A heating and/or air-conditioning device for a motor vehicle which includes a bulkhead separating the engine compartment from the passenger compartment, the device comprising a casing housing a motor-driven fan unit suitable for impelling a flow of air, a heat exchanger and a removable air filter suitable for filtering the impelled airflow, wherein at least a part of a wall of the casing is arranged adjacent to the bulkhead, and wherein the bulkhead and the casing include respective access apertures arranged facing one another in order to allow the filter to be withdrawn from the casing via the engine compartment, exchanged if appropriate and re-inserted into the casing, and further comprising a cover plate suitable for closing off both the aperture in the bulkhead and the aperture in the casing wherein the cover plate includes a flap suitable for closing off the aperture in the bulkhead, on the engine compartment side, and a stopper attached to the flap and suitable for jointly closing off the aperture in the bulkhead and the aperture in the casing and wherein the stopper is formed from at least one insulating foam.

2. The device of claim 1, wherein the stopper includes an outer shell made of dense foam surrounding an inner lining made of lightweight foam serving for wedging the filter.

3. The device of claim 1, wherein the air filter is disposed between the motor-driven fan unit and the heat exchanger.

4. The device of claim 1, wherein the motor-driven fan unit and the air filter are disposed side-by-side in the transverse direction of the vehicle.

5. The device of claim 1, wherein the motor-driven fan unit includes a centrifugal turbine suitable for being driven in rotation about a horizontal axis parallel to the longitudinal axis of the vehicle.

6. The device of claim 1, wherein the cover plate is accessible via the aperture in the bulkhead and is suitable for closing off the aperture in the casing.

7. The device of claim 6, wherein the cover plate is suitable for closing off the aperture in the bulkhead.

* * * * *